(12) United States Patent
Amino et al.

(10) Patent No.: US 9,016,158 B2
(45) Date of Patent: Apr. 28, 2015

(54) HEAD STRUCTURE OF ROBOT, AND DRIVING METHOD FOR THE HEAD

(75) Inventors: Azusa Amino, Tokyo (JP); Ryosuke Nakamura, Tokyo (JP); Taishi Ueda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/114,817

(22) PCT Filed: May 25, 2011

(86) PCT No.: PCT/JP2011/061933
§ 371 (c)(1),
(2), (4) Date: Oct. 30, 2013

(87) PCT Pub. No.: WO2012/160659
PCT Pub. Date: Nov. 29, 2012

(65) Prior Publication Data
US 2014/0060224 A1 Mar. 6, 2014

(51) Int. Cl.
| | |
|---|---|
| *F16H 19/08* | (2006.01) |
| *B25J 17/00* | (2006.01) |
| *A63H 13/00* | (2006.01) |
| *A63H 3/20* | (2006.01) |
| *A63H 11/00* | (2006.01) |

(52) U.S. Cl.
CPC ................. *F16H 19/08* (2013.01); *B25J 17/00* (2013.01); *A63H 3/20* (2013.01); *A63H 11/00* (2013.01); *A63H 13/00* (2013.01); *Y10S 901/23* (2013.01); *Y10S 901/26* (2013.01)

(58) Field of Classification Search
CPC ........... B25J 17/00; A63H 3/20; A63H 11/00; A63H 13/00; F16H 19/08

USPC ......... 74/89, 490.01, 490.02, 490.03, 490.04, 74/490.05, 490.06, 490.07; 901/1, 14, 15, 901/18, 19–40, 50; 318/568.12, 568.21; 180/7.1, 8.1, 8.3, 8.5, 8.6; 248/583, 248/595; 446/376, 380, 384, 391
See application file for complete search history.

(56) References Cited

U.S. PATENT DOCUMENTS

| | | | | |
|---|---|---|---|---|
| 2,243,043 | A | * | 5/1941 | Walter ........................... 446/355 |
| 2,290,801 | A | * | 7/1942 | Dale et al. ........................ 40/414 |
| 2,877,825 | A | * | 3/1959 | Olson ............................ 248/595 |
| 3,093,372 | A | * | 6/1963 | Cirami ............................. 472/27 |
| 3,672,096 | A | * | 6/1972 | Johmann ........................ 446/338 |

(Continued)

FOREIGN PATENT DOCUMENTS

| | | |
|---|---|---|
| JP | 01-150042 A | 6/1989 |
| JP | 2002-154082 A | 5/2005 |

(Continued)

*Primary Examiner* — William Kelleher
*Assistant Examiner* — Valentin Craciun
(74) *Attorney, Agent, or Firm* — Mattingly & Malur, PC (57) ABSTRACT

A head structure of a robot according to the invention includes a first motor and a second motor so supported side by side within a head of the robot that output shafts are positioned coaxially with each other; a left elastic frame that is so driven by the first motor and one end of which is so fitted as to be rotatable around the output shaft and the other end of which extending in a perpendicular direction from the output shaft is supported by a trunk of the robot; and a right elastic frame that is so driven by the second motor and one end of which is so fitted as to be rotatable around the output shaft and the other end of which extending side by side with the left elastic frame from the output shaft is supported by the trunk.

6 Claims, 8 Drawing Sheets

(56) References Cited

U.S. PATENT DOCUMENTS

| | | | |
|---|---|---|---|
| 3,672,097 A * | 6/1972 | Gardel et al. | 446/352 |
| 4,031,657 A * | 6/1977 | Crosman et al. | 446/333 |
| 4,095,367 A * | 6/1978 | Ogawa | 446/73 |
| 4,305,222 A * | 12/1981 | Terzian et al. | 446/288 |
| 4,595,379 A * | 6/1986 | Rasmussen et al. | 446/341 |
| 4,699,603 A * | 10/1987 | Saigo et al. | 446/304 |
| 5,042,807 A * | 8/1991 | Sasakawa et al. | 273/440.1 |
| 5,087,219 A * | 2/1992 | Price | 446/336 |
| 5,151,859 A * | 9/1992 | Yoshino et al. | 701/23 |
| 5,306,199 A * | 4/1994 | Locricchio | 446/177 |
| 5,606,494 A * | 2/1997 | Oshima et al. | 700/59 |
| 6,093,078 A * | 7/2000 | Cook | 446/354 |
| 6,244,925 B1 * | 6/2001 | Chou | 446/354 |
| 6,401,846 B1 * | 6/2002 | Takenaka et al. | 180/8.6 |
| 6,431,514 B1 * | 8/2002 | Ailing | 248/315 |
| 6,463,356 B1 * | 10/2002 | Hattori et al. | 700/245 |
| 6,583,595 B1 * | 6/2003 | Hattori et al. | 318/567 |
| 6,650,966 B1 * | 11/2003 | Baba et al. | 700/245 |
| 7,013,201 B2 * | 3/2006 | Hattori et al. | 700/245 |
| 7,065,490 B1 * | 6/2006 | Asano et al. | 704/275 |
| 7,096,983 B2 * | 8/2006 | Hirai et al. | 180/8.1 |
| 7,111,696 B2 * | 9/2006 | Miyazaki et al. | 180/8.5 |
| 7,278,501 B2 * | 10/2007 | Mori et al. | 180/8.5 |
| 7,603,199 B2 * | 10/2009 | Takenaka et al. | 700/245 |
| 7,984,775 B2 * | 7/2011 | Suga et al. | 180/8.1 |
| 2003/0208301 A1 * | 11/2003 | Baba et al. | 700/245 |
| 2004/0074679 A1 * | 4/2004 | Miyazaki et al. | 180/8.1 |
| 2005/0021180 A1 * | 1/2005 | Kwon et al. | 700/245 |
| 2008/0026669 A1 * | 1/2008 | Rehkemper et al. | 446/301 |
| 2009/0118865 A1 | 5/2009 | Egawa et al. | |
| 2011/0054681 A1 * | 3/2011 | Amino et al. | 700/245 |
| 2014/0090508 A1 * | 4/2014 | Hirano | 74/490.05 |

FOREIGN PATENT DOCUMENTS

| | | |
|---|---|---|
| JP | 2005-125469 A | 5/2005 |
| JP | 2005-279856 A | 10/2005 |
| JP | 2006-043780 A | 2/2006 |
| JP | 2006-061224 A | 3/2006 |
| JP | 2006-167832 A | 6/2006 |
| JP | 2009-113136 A | 5/2009 |

* cited by examiner

HEAD STRUCTURE OF ROBOT, AND DRIVING METHOD FOR THE HEAD

TECHNICAL FIELD

The present invention relates to the head structure of a robot having a head so fitted to a trunk as to operate relative to the trunk, and a driving method for the head.

BACKGROUND ART

Known head structures of human-shaped robots include one having a head connected to the trunk via four-node link mechanisms comprising left and right pairs (e.g. see Patent Literature 1). Each of these pairs of four-node link mechanisms has a structure that is symmetric between left and right. More specifically, the left and right pairs of four-link mechanisms are configured of lower joints disposed at four corners, forward, backward, leftward and rightward, of a rectangular plate horizontally arranged on the trunk side of the robot, upper joints disposed at four corners, forward, backward, leftward and rightward, of a rectangular frame horizontally arranged on the head side, two links so arranged as to cross each other on the left and right sides (a total of four links, with all the left and right ones counted) and spanning between the left forward upper joints and the left backward lower joints (hereinafter this link may be sometimes referred to as a "drive link"), a link spanning between the right forward upper joints and the right backward lower joints, and a link spanning between the right forward lower joints and the right backward upper joints.

Also, in the left side four-node link mechanism, a drive motor having its output shaft coaxially with the left backward upper joint is arranged, and this drive motor causes the "drive link" to so turn around the output shaft as to form a prescribed angle relative to the left side edge of the rectangular frame. As a result, in the left and right pairs of four-node link mechanisms, the rectangular frame on the head side arranged above the rectangular plate on the trunk side is shifted forward and backward, interlocked with the rotational action of this "drive link". Further, the left and right pairs of four-node link mechanisms, interlocked with the rotational action of this "drive link", causes the angle of the rectangular frame on the head side formed relative to the rectangular plate on the trunk side to vary. In other words, by the head structure of this robot, the head is enabled to vary its elevation/depression angle, namely to make a nodding action, being interlocked with the forward and backward shifting of the head.

CITATION LIST

Patent Literature

Patent Literature 1: Japanese Unexamined Patent Application Publication No. 2006-167832

SUMMARY OF INVENTION

Technical Problem

However, as the head in the head structure of any known robot (e.g., see Patent Literature 1) makes a nodding action with left and right pairs of four-node link mechanisms, these left and right pairs of four-node link mechanism have eight joints and eight links in total as their constituent elements. For this reason, in order to cause the head to make a nodding action via these four-node link mechanisms, a drive motor having a relatively high power output is required. Moreover, if it is attempted to have this known robot head structure shake the head left and right in addition to the nodding action, another motor to drive the robot head to rotate around its vertical axis will be needed besides the drive motor to drive the "drive link" to rotate. And if the robot head is mounted with a heavy item comprising an audiovisual system and its accessories, a drive motor with an even greater power output will be needed, and a problem of increasing the robot's own weight will arise.

Therefore, there is desired a robot head structure that can accomplish shaking actions and a nodding action of the head with a more simplified drive mechanism than any known one for the robot head structure.

Accordingly, a problem to be addressed by the present invention is to provide a robot head structure that can accomplish shaking actions and a nodding action of the head with a more simplified drive mechanism than any known one for the robot head structure, and a head driving method for the structure.

Solution to Problem

In order to address the problem cited above, a head structure of a robot according to one aspect of the invention comprises a first motor and a second motor so supported side by side within the head of the robot as to position their output shafts coaxially; a first elastic beam member that is driven by the first motor and of which one end is so fitted as to be rotatable around the output shafts and the other end extending in a perpendicular direction from the output shafts is supported by a trunk of the robot; and a second elastic beam member that is driven by the second motor and of which one end is so fitted as to be rotatable around the output shafts and the other end extending from the output shafts side by side with the first elastic beam member is supported by the trunk.

Also to address the problem cited above, by a head driving method according to another aspect of the invention, a head structure for the head structure of a robot comprising left and right shafts defined by the head of the robot; and a pair of elastic beam members each of which extends from one or the other of the two sides of the head where the left and right shafts pass and the tips of which are supported by the trunk, the pair of elastic beam members are revolved relative to the head individually around the left and right shafts in the same direction as or reverse directions to each other.

Advantageous Effects of Invention

The invention can provide a robot head structure that can accomplish shaking actions and a nodding action of the head with a more simplified drive mechanism than any known one for the robot head structure, and a head driving method for the structure

BRIEF DESCRIPTION OF DRAWINGS

[FIG. 1]
[FIG. 2]
FIG. 2 are configuration describing diagrams of the robot head structure pertaining to the embodiment of the invention, of which
FIG. 2(a) is a perspective view showing the head structure as viewed down from behind obliquely leftward and FIG. 2(b) is a perspective view showing the head structure as viewed up from behind obliquely leftward.

[FIG. 3]

[FIG. 4]

[FIG. 5]

[FIG. 6]

FIG. 6 are drawings showing a modified case of the action of the robot head in the embodiment of the invention, of which FIG. 6(a) is a perspective view of the modified case of the action of the head and FIG. 6(b) is a graph showing a case of actions of the first motor and the second motor in the modified action case of FIG. 6(a).

[FIG. 7]

FIG. 7 are descriptive drawings of the head structure of the robot in the modified case of the invention, of which FIG. 7(a) is a front view of the state of the head structure when the head is shaken to look forward to the right, FIG. 7(b) is a perspective view showing the head structure of FIG. 7(a) as viewed down from ahead leftward, FIG. 7(c) is a left side profile of the head structure of FIG. 7(a), and FIG. 7(d) is a plan of the head structure of FIG. 7(a).

[FIG. 8]

FIG. 8 are descriptive drawings of the head structure of the robot in another modified case of the invention, of which FIG. 8(a) is a front view of the state of the head structure when the head is shaken to look forward to the right, FIG. 8(b) is a perspective view showing the head structure of FIG. 8(a) as viewed down from ahead leftward, FIG. 7(c) is a left side profile of the head structure of FIG. 8(a), and FIG. 8(d) is a plan of the head structure of FIG. 8(a).

DESCRIPTION OF EMBODIMENT

Next, an embodiment of the invention will be described in detail with reference to drawings as appropriate.

Regarding this embodiment, after describing the overall configuration of a robot equipped with the head structure of the invention, this head structure will be described in detail. In the following description, the forward, backward, upward, downward, leftward and directions refer to the forward, backward, upward, downward, leftward and rightward directions in FIG. 1, which are made consistent with a normal state in which the robot stands on a horizontal plane, and the forward, backward, upward, downward, leftward and rightward directions of the head refer to the forward, backward, upward, downward, leftward and rightward directions of a state in which the robot standing in this way is looking straight ahead as shown in FIG. 1.

<Overall Configuration of Robot)

Figure 1:
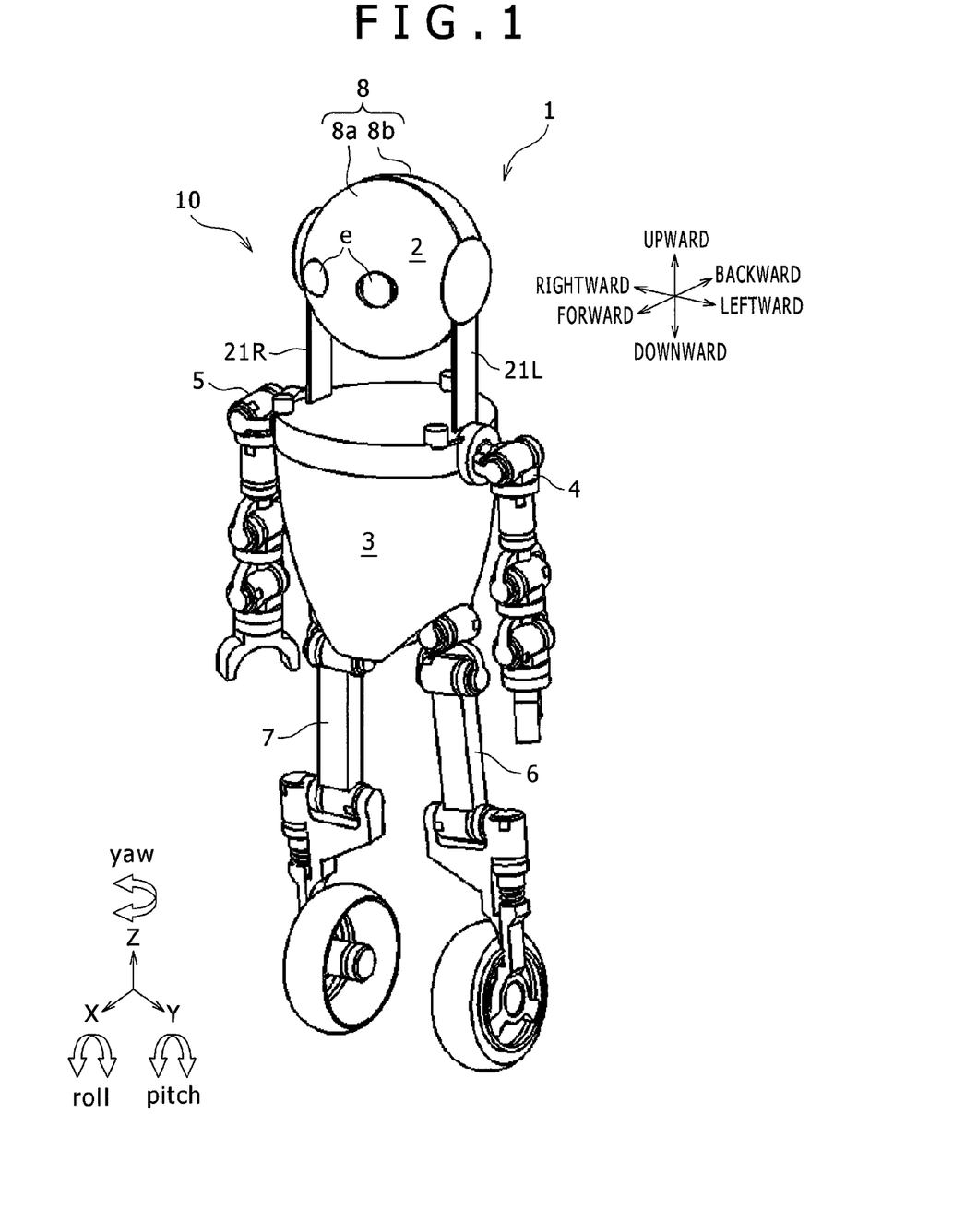
FIG. 1 is a perspective view for describing the overall configuration of a robot equipped with a head structure pertaining to an embodiment of the invention.

FIG. 1 is a perspective view for describing the overall configuration of the robot equipped with the head structure pertaining to the embodiment of the invention.

A robot 1 in this embodiment, as shown in FIG. 1, has two legs including a left leg 6 and a right leg 7, a trunk 3 disposed over these legs, a left arm 4 and a right arm 5 fitted to respectively the left and right sides of this trunk 3, and a head 2 fitted to the upper part of the trunk 3 via a left elastic frame 21L and a right elastic frame 21R, respectively. Incidentally, the left elastic frame 21L corresponds to a "first elastic beam", and the right elastic frame 21R to a "second elastic member", both as referred to in claims. Further, these left elastic frame 21L (first elastic beam) and right elastic frame 21R (second elastic member) and the head 2 make up a "robot head structure" (which hereinafter may be sometimes referred to as simply a "head structure 10").

The left leg 6 and the right leg 7 are used for shifting the robot 1. Namely, the robot 1 in this embodiment is a human-shaped robot 1 that shifts by so-called two-foot walking.

The left arm 4 and the right arm 5 are used in such tasks as holding an object.

The trunk 3 is a control device (not shown) for controlling the actions of different parts of this robot 1, and this control device is equipped with various sensors (not shown) for outputting detection signals and other units. Incidentally, as the sensors, for instance a sensor that detects the angle of inclination of the trunk 3 relative to the direction of gravity, a sensor that detects the angular velocity when the trunk 3 inclines, a sensor that detects the distance between the robot 1 and any structure (not shown) around it, and a sensor that detects lights, sounds, temperatures and other factors around the robot 1 can be cited.

In FIG. 1, the X axis represents a horizontal component in the forward direction of the robot 1, the Y axis, a component in a direction orthogonal to the X axis in the horizontal plane and the Z axis, a component orthogonal to the horizontal plane. Further, an arrow "roll" around the X axis represents the roll direction of the robot 1, an arrow "pitch" around the Y axis, the pitch direction of the robot 1, and an arrow "yaw" around the Z axis, the yaw direction of the robot 1 (the same applies hereinafter). In other words, in this embodiment, the X axis represents the back-and-forth direction, the Y axis, the left-and-right direction, and the Z axis, the up-and-down direction.

<Robot Head Structure>

A head structure 10 pertaining to this embodiment, as shown in FIG. 1, is configured of the head 2, the left elastic frame 21L (first elastic beam) and right elastic frame 21R (second elastic member), a first motor 20L and a second motor R to be described afterwards (see FIGS. 2(a) and 2(b)).

The external appearance of the head 2 is formed of a substantially spherical casing 8 formed by putting together a front half 8a and a rear half 8b, both substantially semispherical. And ahead of the front half 8a, there is formed an eye part e on which a CCD camera among others is arranged, and this front face of the front half 8a constitutes an aesthetically designed face.

FIG. 2(a) referred to next is a perspective view showing the head structure as viewed down from behind obliquely leftward, and FIG. 2(b), a perspective view showing the head structure as viewed up from behind obliquely leftward. The head 2 in FIGS. 2(a) and 2(b) is shown in a state in which the rear half 8b is removed from the front half 8a to reveal its internal structure.

The head 2, as shown in FIGS. 2(a) and 2(b), is provided with a first motor 20L and a second motor 20R within the casing 8.

A head frame 11 is formed of a plate arranged between the front half 8a and the rear half 8b making up the casing 8. It is not only a supporting member that integrates the front half 8a and the rear half 8b with each other but also a supporting member that supports the first motor 20L and the second motor 20R to be described next. Incidentally, the head frame 11 in this embodiment is formed of a substantially H-shaped plate in a planar view.

The first motor 20L and the second motor 20R are so supported side by side by the head frame 11 in the casing 8 that output shafts 9L and 9R denoted by hidden lines (broken lines) in FIGS. 2(a) and 2(b) are positioned coaxially with each other. A shaft, denoted by reference sign 40 in FIGS. 2(a) and 2(b), on which the output shafts 9L and 9R are positioned is defined to be along the Y' axis, and hereinafter may be sometimes referred to as a head pitch shaft 40.

And the first motor 20L and the second motor 20R in this embodiment are so arranged as to be symmetric between left and right relative to the back-and-forth direction of the robot 1 (see FIG. 1). More specifically, the first motor 20L is so arranged that its output shaft 9L is connected to one end of the left elastic frame 21L (first elastic beam) arranged to the left side of the head 2. And the second motor 20R is so arranged that its output shaft 9L is connected to one end of the right elastic frame 21R (second elastic beam) arranged to the right side of the head 2.

In this embodiment, in addition to the first motor 20L and the second motor 20R as drive power sources, an actuator equipped with reduction gearing and, an angle detector (e.g. a rotary encoder or a potentiometer) can also be provided though not shown.

The left elastic frame 21L as the first elastic beam, one end of which is fitted to be rotatable around the output shaft 9L of the first motor 20L as stated above, is formed of a member long in one direction, extending vertically from this output shaft 9L. Incidentally, the left elastic frame 21L in this embodiment is formed of a thin plate long in the up-and-down direction.

Also, the right elastic frame 21R as the second elastic beam, one end of which is fitted to be rotatable around the output shaft 9R of the second motor 20R as stated above, is formed of a member long in one direction, extending vertically from this output shaft 9R, namely extending side by side with the left elastic frame 21L. Incidentally the right elastic frame 21R in this embodiment, like the left elastic frame 21L, is formed of a thin plate long in the up-and-down direction.

And the other end of the left elastic frame 21L extending vertically from the output shaft 9L of the first motor 20L and the other end of the right elastic frame 21R extending vertically from the output shaft 9R of the second motor 20R, as shown in FIGS. 2(a) and 2(b), respectively, are axially supported by a trunk frame 12. Namely, these left elastic frame 21L and right elastic frame 21R function as a neck linking the trunk 3 and the head 2, and the trunk frame 12 is positioned at the root of the neck (neck base).

Whereas such a left elastic frame 21L and a right elastic frame 21R can be formed of a known material having elasticity, it is particularly desirable for them to be formed of a metallic material excelling in flexibility and torsional elasticity, such as stainless steel, or a resin material such as engineering plastic. Also, a composite material consisting of a plurality of materials, such as a laminated material, can be used for the left elastic frame 21L and the right elastic frame 21R.

The trunk frame 12 in this embodiment is configured of a plate 12a long in the lateral direction and a pair of flanges 12b extending upward from the two ends of this plate in a curved shape. And the flanges 12b are provided with shaft supports 15L and 15R that axially support the other ends of the left elastic frame 21L and the right elastic frame 21R, respectively. These shaft supports 15L and 15R are arranged on a shaft 41 defined to be along the Y axis. This shaft 41 may be hereinafter sometimes referred as the neck base pitch shaft 41. Further, this neck base pitch shaft 41 corresponds to "a prescribed axis defined to be along the left-and-right direction of the trunk" in the wording of the claims.

Reference sign 12c in FIG. 2(a) denotes a supporting hole that rotatably supports a shaft support 13b of a connecting link 13, which is a constituent member of a differential mechanism 27 (see FIG. 2(b)) to be described next, relative to the trunk frame 12.

The head structure 10 pertaining to this embodiment is further provided with the differential mechanism 27 as shown in FIG. 2(b). This differential mechanism 27 is contains a link mechanism to be described next, so configured that the left elastic frame 21L and the right elastic frame 21R around the shaft supports 15L and 15R, respectively, turning in mutually reverse directions (see FIG. 5).

The differential mechanism 27 in this embodiment is provided, as shown in FIG. 2(b), with a left neck base link 22L, a right neck base link 22R, the connecting link 13 and the shaft support 13b The left neck base link 22L is configured of a plate formed integrally with the left elastic frame 21L so as to extend farther downward from the other end of the left elastic frame 21L. In this plate, a long hole 26L, long in the up-and-down direction, is formed to let one end of the connecting link 13 be inserted.

The right neck base link 22R is configured of a plate formed integrally with the right elastic frame 21R so as to extend farther downward from the other end of the right elastic frame 21R. In this plate, a long hole 26R, long in the up-and-down direction, is formed to let the other end of the connecting link 13 be inserted.

The connecting link 13, intended for linking the left neck base link 22L and the left elastic frame 21L, is extended in the longitudinal direction of the trunk frame 12 underneath the trunk frame 12. This connecting link 13 has spherically shaped joints 13a at its two ends. Incidentally, only the left side joint 13a is shown in FIGS. 2(a) and 2(b), but illustration of the right side joint 13a is dispensed with. Each of these joints 13a is inserted, as stated above, into one or the other of the long hole 26L in the left neck base link 22L and the long hole 26R in the right neck base link 22R; as will be described in detail afterwards, when the left elastic frame 21L and the right elastic frame 21R rotate around the shaft supports 15L and 15R, respectively, they shift within the long hole 26L and the long hole 26R in their longitudinal direction.

The shaft support 13b, which is one element of the differential mechanism 27 in this embodiment, as shown in FIG. 2(b), is fitted to the central part of the connecting link 13. This shaft support 13b is inserted into the supporting hole 12c to enable the connecting link 13 to rotate around an axis 43 and is supported by a stop ring, not shown, on the trunk frame 12. The axis 43 in this embodiment can be defined on a perpendicular line extending from the central part of the connecting link 13. In other words, when the trunk 3 is so arranged as to be horizontal relative to a plate face (top face or bottom face) of the trunk frame 12, the axis 43 extends on a vertical line (along the X axis). Namely, the connecting link 13 rotates in the yaw direction (see FIG. 1).

Next, with respect to the actions of the head structure 10 pertaining to this embodiment, the head driving method will be described with reference to drawings as appropriate.

The head driving method of this embodiment features, as will be described afterwards, rotation of head pitch shafts 40 ("left and right shafts" in the wording of claims) defined by the head 2 in the same direction as or reverse directions to each other.

Figure 3:
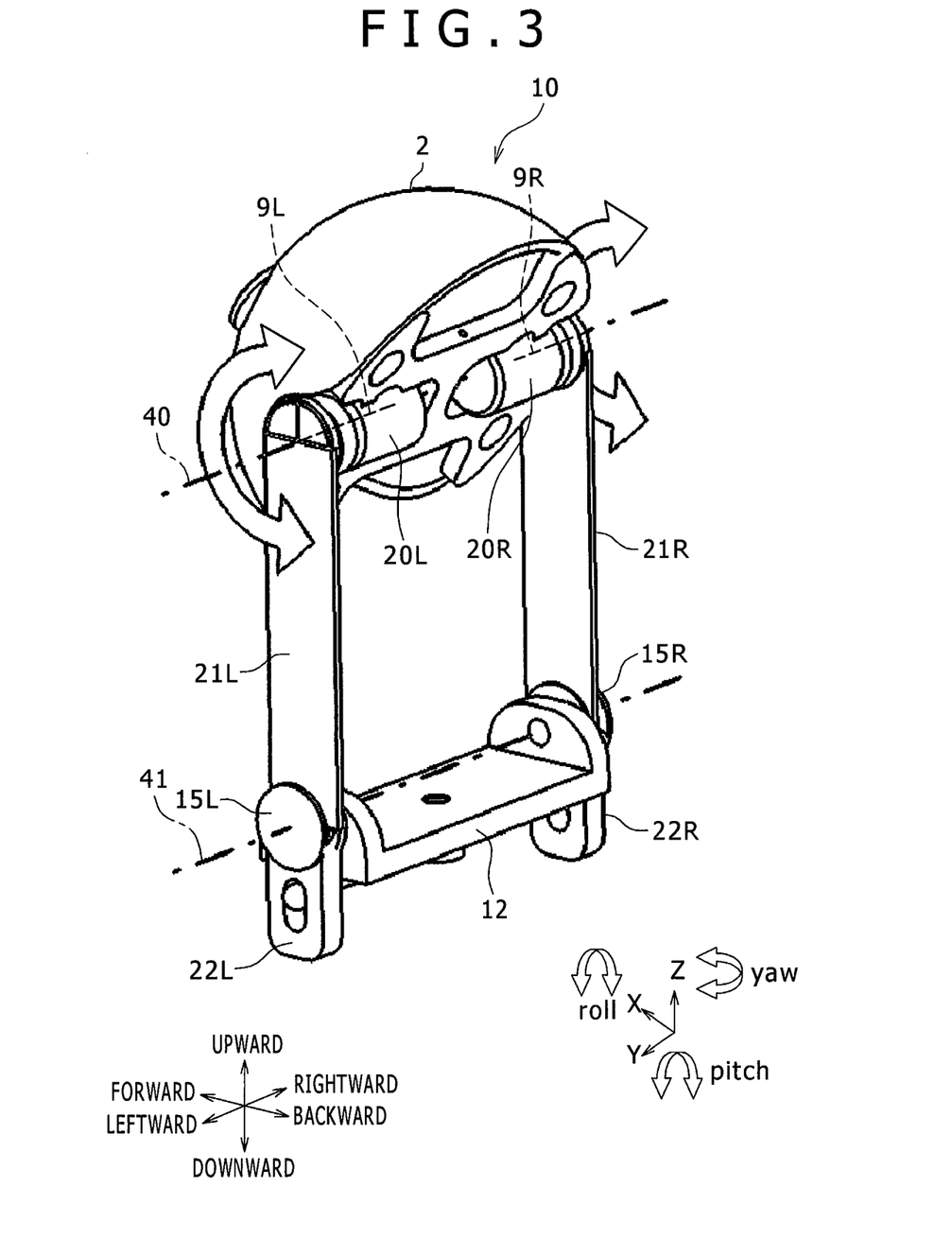
FIG. 3 is a perspective view showing a case of actions of a first motor and a second motor in the embodiment of the invention when the robot head is caused to make a nodding action.
Figure 4:
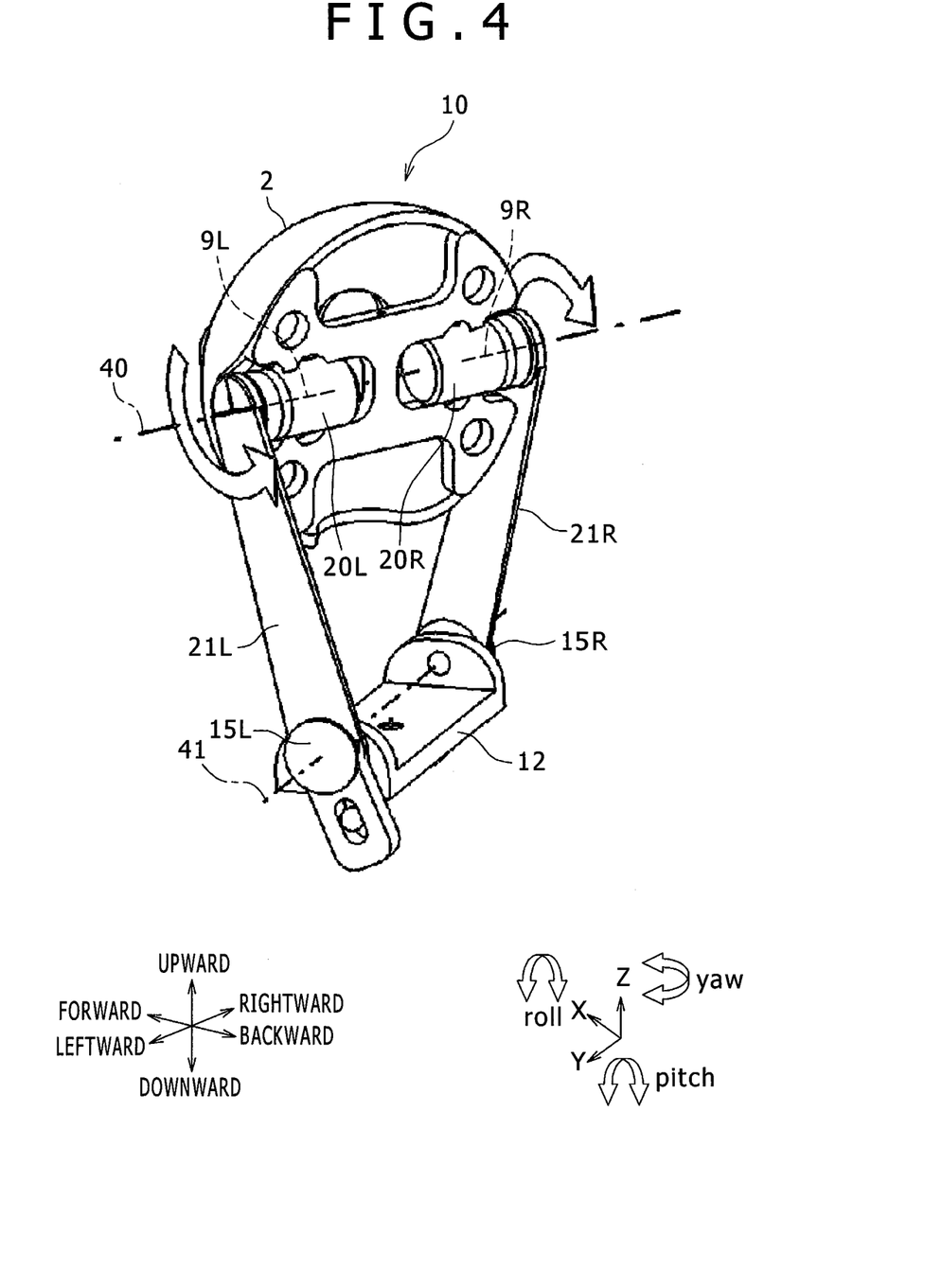
FIG. 4 is a perspective view showing a case of actions of the first motor and the second motor in the embodiment of the invention when the robot head is caused to make shaking actions and a nodding action.

FIG. 3, which is referred to here, is a perspective view showing a case of actions of the first motor and the second motor in the embodiment of the invention when the robot head is caused to make a nodding action. FIG. 4 is a perspective view showing a case of actions of the first motor and the second motor in the embodiment of the invention when the robot head is caused to make shaking actions and the nodding action.

In FIG. 3 and FIG. 4, reference sign 10 denotes a head structure pertaining to this embodiment for causing the head 2 to act; reference sign 9L, the output shaft of the first motor 20L to which one end of the left elastic frame 21L is to be fitted; reference sign 9R, the output shaft of the second motor 20R to which one end of the right elastic frame 21R is to be fitted; reference sign 12, the trunk frame to which the other end of the left elastic frame 21L and the other end of the right elastic frame 21R are to be fitted via the shaft support 15L and the shaft support 15R; reference sign 40 are to be fitted via the shaft support 15L and the shaft support 15R; reference sign 40, the head pitch shafts; and reference sign 41, the neck base pitch shaft.

In this head structure 10, when the output shaft 9L of the first motor 20L and the output shaft 9R of the second motor 20R rotate on the head pitch shafts 40 in the same direction as shown in FIG. 3, the head 2 rotates around the head pitch shafts 40 on the one end sides of the left elastic frame 21L and the right elastic frame 21R. And, as the other ends of the left elastic frame 21L and the right elastic frame 21R are supported by the trunk 3 (see FIG. 1) via the trunk frame 12, the nodding action is made in this head structure 10 by shaking the head 2 up and down via the trunk 3.

Next, a case is supposed in which the output shaft 9L of the first motor 20L and the output shaft 9R of the second motor 20R rotate on the head pitch shafts 40 in mutually different directions.

For instance as shown in FIG. 4, with the head structure 10 viewed from the left flank, when the output shaft 9L of the first motor 20L turns leftward on the head pitch shafts 40 and the output shaft 9R of the second motor 20R turns rightward on the head pitch shafts 40, the left elastic frame 21L of which one end is fitted to the output shaft 9L is induced to turn leftward around the output shaft 9L and at the same time the right elastic frame 21R of which one end is fitted to the output shaft 9R is induced to turn rightward around the output shaft 9R. On the other hand, as the other end of the left elastic frame 21L and the other end of the right elastic frame 21R are supported by the trunk frame 12 via the shaft support 15L and the shaft support 15R, the left elastic frame 21L, while twisting itself, so rotates around the shaft support 15L as to cause one end side of the left elastic frame 21L to shift forward and, at the same time, the right elastic frame 21R, while twisting itself, so rotates around the shaft support 15R as to cause one end side of the right elastic frame 21R to shift backward. As a result, the head 2 so shakes its neck on the trunk 3 (see FIG. 1) on which the trunk frame 12 is supported as to turn rightward.

Also, with the head structure 10 viewed from the left flank, when the output shaft 9L of the first motor 20L turns on the head pitch shafts 40 rightward, the reverse direction to the leftward turn shown in FIG. 4, and at the same time the output shaft 9R of the second motor 20R turns on the head pitch shafts 40 leftward, the reverse direction to the rightward turn shown in FIG. 4, the head 2 is so shaken as to turn to the left, though not shown.

Therefore in this head structure 10, consecutive leftward and rightward head shaking is accomplished by alternately changing the turning directions of the output shaft 9L and the output shaft 9R in this way. Further in the leftward and rightward head shaking by this head structure 10, while the righting moments of the left elastic frame 21L and the right elastic frame 21R against torsional deformation are utilized when the head 2 shifts from its leftward shaken position or rightward shaken position to a straight looking position (facing the front), the rotational forces of the first motor 20L and the second motor 20R can also be utilized.

The shaking angle (yaw angle) of the head 2 can be controlled by varying the rotational angles of the output shaft 9L of the first motor 20L and the output shaft 9R of the second motor 20R.

Figure 5:
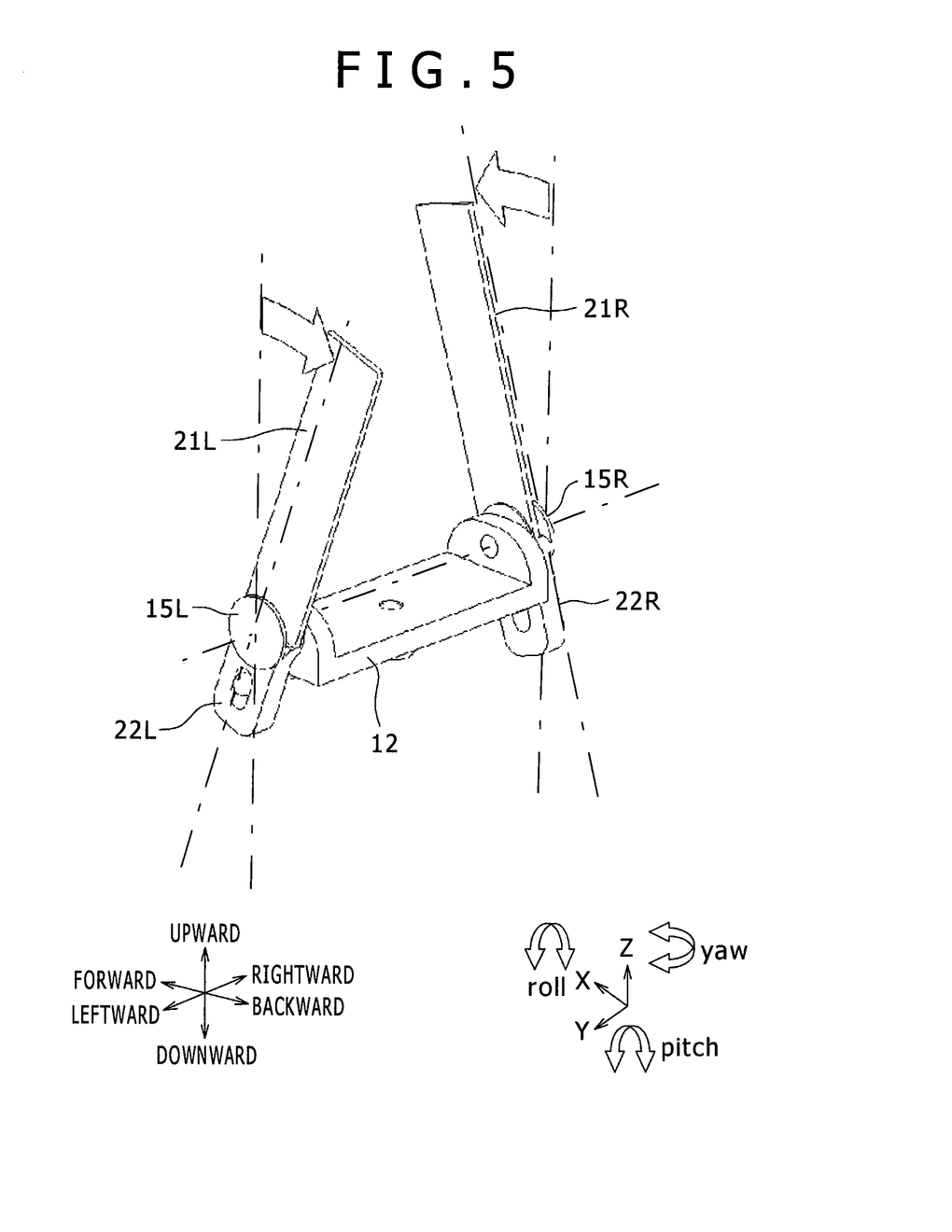
FIG. 5 is a perspective view for describing an action of a differential mechanism in the embodiment of the invention, showing a case of actions of a left elastic frame as a first elastic beam member and a right elastic frame as a second elastic beam member.

Next, the actions of the differential mechanism 27 (see FIG. 2(b)) will be described. Although this differential mechanism 27 is not an indispensable constituent element for the leftward and rightward shaking actions of the head 2 in the head structure 10 pertaining to this embodiment, this differential mechanism 27 can help accomplish the leftward and rightward shaking actions of the head 2 more smoothly. FIG. 5 is a perspective view for describing the action of the differential mechanism in the embodiment of the invention, showing a case of actions of the left elastic frame as the first elastic beam member and the right elastic frame as the second elastic beam member.

First, the rotating actions of the left elastic frame 21L and the right elastic frame 21R around the shaft supports 15L and 15R, respectively, will be described with reference to FIG. 2(b) and FIG. 5.

For instance, it is supposed that one end side of the left elastic frame 21L so rotates around its other end supported by the shaft support 15L as to incline backward as shown in FIG. 5.

In this case, the left neck base link 22L formed integrally with the left elastic frame 21L so rotates around the shaft support 15L that its tip points forward. And as the tip of the left neck base link 22L points forward, the joint 13a of the connecting link 13 inserted into the long hole 26L of the left neck base link 22L shown in FIG. 2(b) points forward. On the other hand the connecting link 13, as its central part is supported by the shaft support 13b, makes a paired action to cause the joint part (not shown) of the connecting link 13 inserted into the long hole 26R of the right neck base link 22R to press the right neck base link 22R backward. As a result, as shown in FIG. 5, rotation of the right neck base link 22R around the shaft support 15R so as to direct the tip of the link backward causes the one end side of the right elastic frame 21R to so rotate around its other end side supported by the shaft support 15R as to incline forward.

In other words, even if the left elastic frame 21L should attempt to rotate independently of the right elastic frame 21R as shown in FIG. 5, the differential mechanism 27 shown in FIG. 2(b) would cause the right elastic frame 21R to rotate in the reverse direction interlocked with the left elastic frame 21L.

And, when one end side of this left elastic frame 21L is to so rotate around its other end side supported by the shaft support 15L as to incline forward, inversely to the rotating direction of the left elastic frame 21L shown in FIG. 5, one end side of the right elastic frame 21R so rotates around its other end side supported by the shaft support 15R as to incline backward, though not shown.

Namely, the differential mechanism 27 pertaining to this embodiment (see FIG. 2(b)) causes the left elastic frame 21L and the right elastic frame 21R to rotate around the shaft supports 15L and 15R, respectively, in mutually reverse directions.

As a result, in the head structure 10 pertaining to this embodiment, when the first motor 20L and the second motor 20R cause leftward and rightward head shaking actions to rotate the left elastic frame 21L and the right elastic frame 21R in mutually reverse directions as shown in FIG. 4, the differential mechanism 27 pertaining to this embodiment (see FIG. 2(b)) causes the left elastic frame 21L and the right elastic frame 21R to rotate in mutually reverse directions so as to assist these motions of the left elastic frame 21L and the right elastic frame 21R. Therefore, this head structure 10 enables the leftward and rightward head shaking actions of the head 2 to be accomplished more smoothly than they would in the absence of this differential mechanism 27.

Next, a modified case of the action of the head structure 10 pertaining to this embodiment will be described.

Figure 6:
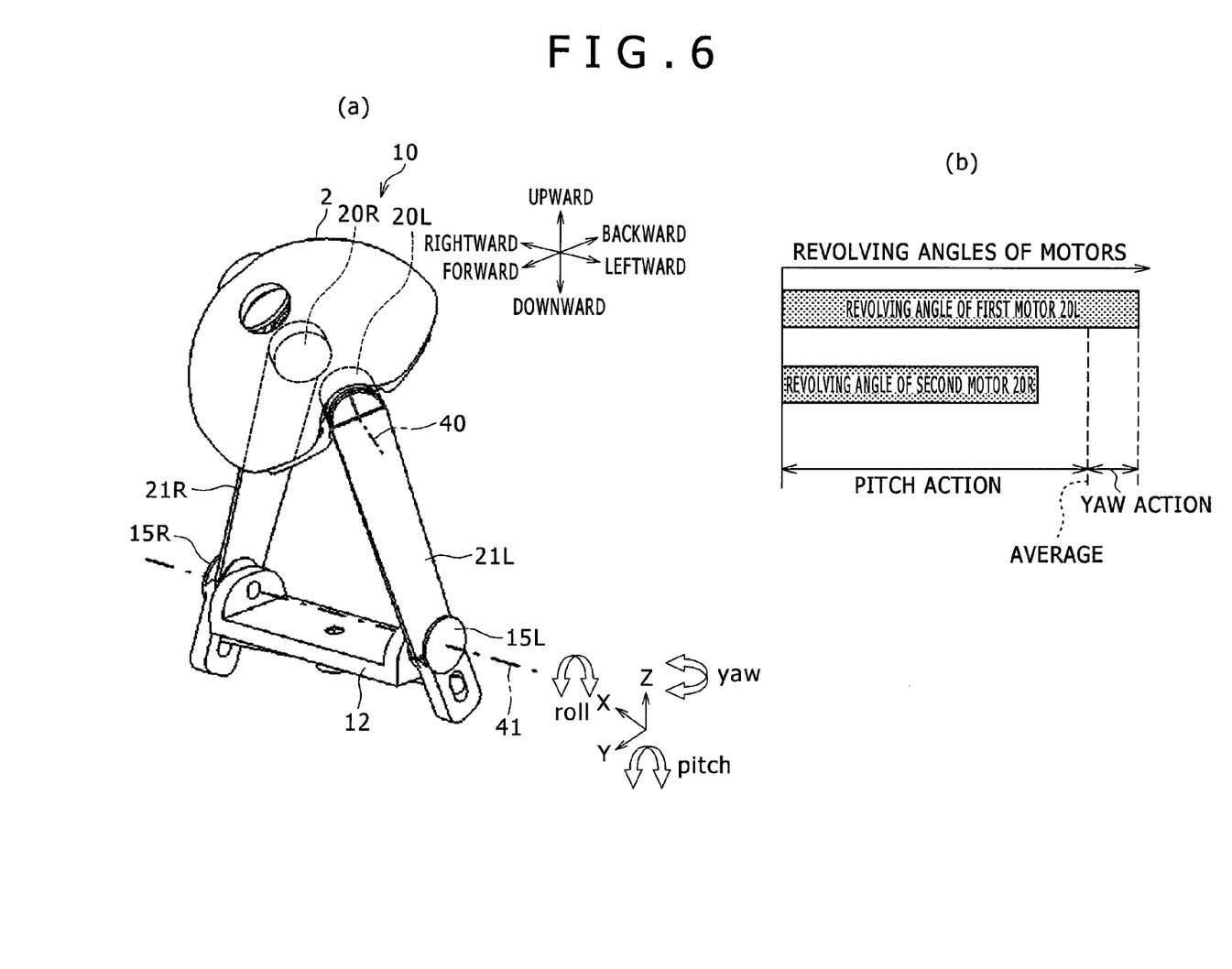

FIG. 6 referred to are drawings showing the modified case of the action of the robot head in the embodiment of the invention, of which FIG. 6(a) is a perspective view of the modified case of the action of the head, and FIG. 6(b) is a graph showing a case of actions of the first motor and the second motor in the modified action case of FIG. 6(a).

In the case of actions of the head structure 10 cited above, when it is attempted to make the head shake (see FIG. 4), the revolving angle of the output shaft 9L of the first motor 20L and the revolving angle of the output shaft 9R of the second motor 20R are supposed to substantially equal (though the turning directions are reverse to each other), but regarding the modified case of actions to be described next, the shaking action of the head 2 in a case where a difference is provided between the revolving angle of the output shaft 9L and the revolving angle of the output shaft 9R will be described.

In FIG. 6(a), reference sign 10 denotes a head structure pertaining to this embodiment that causes the head 2 to act; reference sign 20L, a first motor to which one end of the left elastic frame 21L is to be fitted; reference sign 20R, a second motor to which one end of the right elastic frame 21R is to be fitted; reference sign 12, a trunk frame that fits the other end of the left elastic frame 21L and the other end of the right elastic frame 21R via the shaft support 15L and the shaft support 15R; reference sign 40, a head pitch shaft; and reference sign 41, a neck base pitch shaft.

As shown in FIGS. 6(a) and 6(b), in this modified case of actions, a difference is so provided as to make the revolving angle of the output shaft 9L greater than that of the output shaft 9R. In this modified case, the head 2 turns upward (takes a pitch action) at an elevation angle matching the average of the revolving angles of the first motor 20L and the second motor 20R. And at an angle matching the difference of the revolving angle of the first motor 20L or that of the second motor 20R from the average of the revolving angles of the first motor 20L and the second motor 20R, the head 2 turns rightward (takes a yaw action). Or, when the revolving angle of the first motor 20L is made coincident with that of the second motor 20R while keeping unchanged the revolving angle of the second motor 20R as shown in FIG. 6(b), the head 2 keeps itself upward and stops turning, though not shown.

Or when the revolving angle of the first motor 20L is so altered as to become equal to that of the second motor 20R shown in FIG. 6(b) and at the same time the revolving angle of the second motor 20R is so altered as to become equal to that of the first motor 20L shown in FIG. 6(b), the head 2 turns leftward (takes a yaw action) while keeping its elevation angle, though not shown. In other words, a pitch action is taken according to the average of the revolving angles of the first motor 20L and the second motor 20R, and a yaw action is taken at an angle according to the difference from the average of the revolving angles of the first motor 20L and the second motor 20R.

The head structure 10 of the robot 1 pertaining to this embodiment described above can achieve the following advantageous effects.

The head structure 10 pertaining to this embodiment, as the drive mechanism of the head 2 is basically configured of the first motor 20L and the second motor 20R together with the left elastic frame 21L (first elastic beam) and the right elastic frame 21R (second elastic beam), the drive mechanism is made simpler than any known robot head structure (e.g., see Patent Literature 1).

Therefore, this head structure 10 enables the weight of the robot 1 itself to be reduced.

Also, this head structure 10, as the drive mechanism of the head 2 is simplified, it is less susceptible to mechanical troubles during operation than the head structure of known robot head structures (e.g., see Patent Literature 1) whose drive mechanism is complex and, when the robot 1 suffers any impact from outside, it is less likely to be broken.

Further, as this head structure 10 is simplified in the drive mechanism for the head 2, the manufacturing cost can be reduced.

Further, this head structure 10 enables the drive power sources for leftward and rightward shaking actions of the head 2 to be configured as the same drive power sources for its nodding action (the first motor 20L and the second motor 20R). By providing a difference between the revolving angles of the first motor 20L and the second motor 20R in this configuration, the head shaking actions and the nodding action can be individually controlled.

Further, in this head structure 10 of the robot 1 pertaining to this embodiment, the presence of the differential mechanism 27 can make the head shaking actions smoother.

While the embodiment of the invention has been hitherto described, the invention is not limited to this embodiment, but can be embodied in many different modes.

Figure 7:
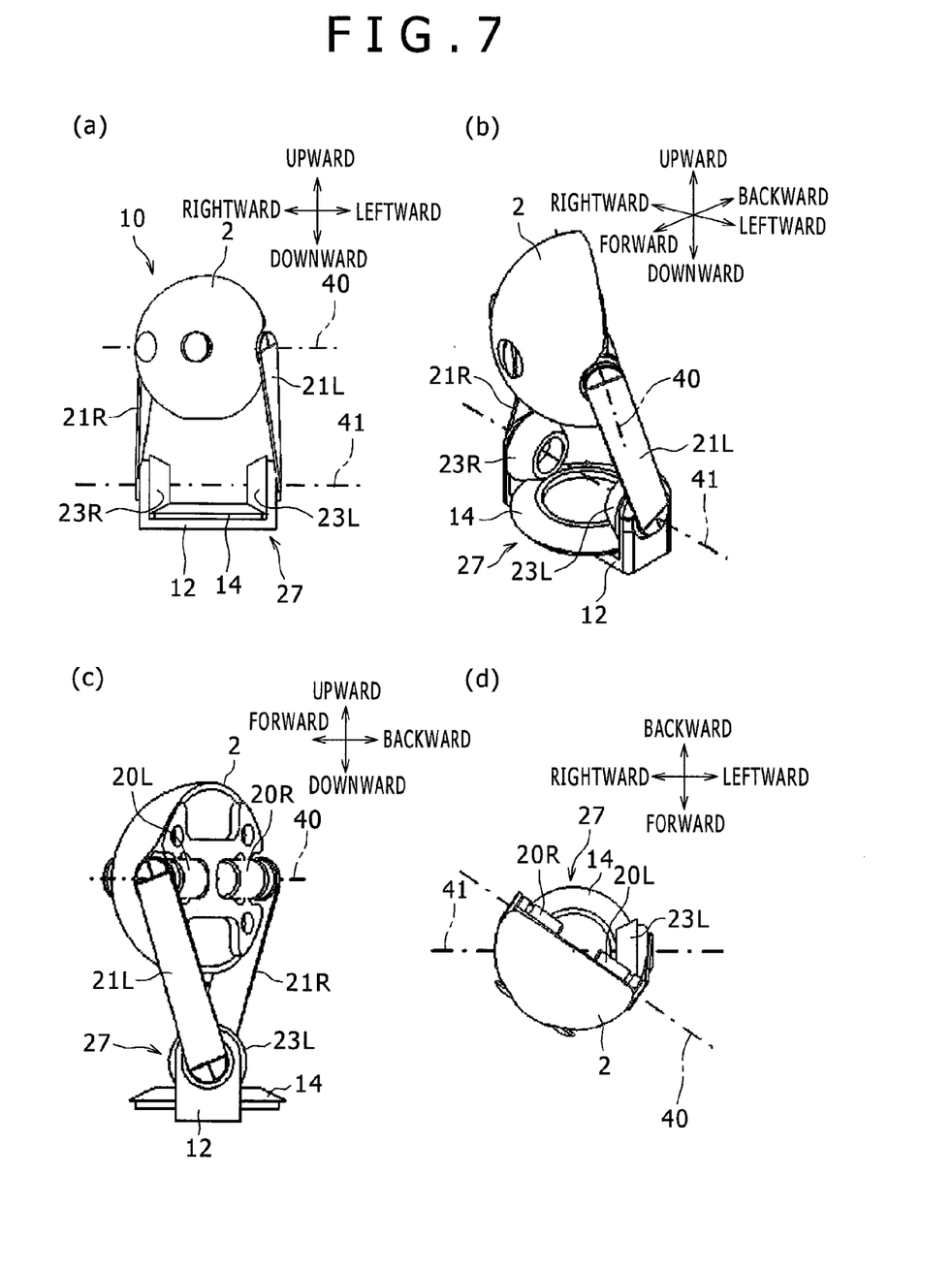

While the differential mechanism 27 involving a link mechanism was described with respect to the foregoing embodiment, the invention imposes no restriction on the configuration of the differential mechanism 27 only if it is a mechanism that allows the left elastic frame 21L (first elastic beam) and the right elastic frame 21R (second elastic beam) to revolve in mutually reverse directions around the neck base pitch shaft 41. FIG. 7 to be referred to next are descriptive drawings of the head structure of the robot having another differential mechanism 27, of which FIG. 7(a) is a front view of the state of the head structure when the head is shaken to look forward to the right, FIG. 7(b) is a perspective view showing the head structure of FIG. 7(a) as viewed down from ahead leftward, FIG. 7(c) is a left side profile of the head structure of FIG. 7(a), and FIG. 7(d) is a plan of the head structure of FIG. 7(a).

In FIGS. 7(a) through 7(d), reference sign 10 denotes a head structure pertaining to this embodiment for causing the head 2 to act; reference sign 20L, a first motor to which one end of the left elastic frame 21L is to be fitted; reference sign 20R, a second motor to which one end of the right elastic frame 21R is to be fitted; reference sign 23L, a left bevel gear to be fitted to the other end of the left elastic frame 21L; reference sign 23R, a right bevel gear to be fitted to the other end of the right elastic frame 21R; reference sign 14, a central bevel gear that meshes with the left bevel gear 23L and the right bevel gear 23R; reference sign 12, a trunk frame that rotatably bears the left bevel gear 23L, the right bevel gear 23R and the central bevel gear; reference sign 40, a head pitch shaft; and reference sign 41, a neck base pitch shaft.

As shown in FIGS. 7(*a*) through 7(*d*), the differential mechanism 27 here is configured of the left bevel gear 23L and the right bevel gear 23R so arranged as to oppose each other and to be respectively fitted to the other end of the left elastic frame 21L and the other end of the right elastic frame 21R, and the central bevel gear 14 so arranged as to mesh with these left and right bevel gears 23L and 23R.

As this differential mechanism 27, unlike the differential mechanism 27 in the foregoing embodiment involving the link mechanism that converts a linear motion into a rotational motion, causes the left elastic frame 21L and the right elastic frame 21R to revolve in mutually reverse direction with only the turning motions of the left bevel gear 23L, the right bevel gear 23R and the central bevel gear 14, the head shaking actions can be made smoother. Each of the left bevel gear 23L, the right bevel gear 23R and the central bevel gear 14 in this embodiment has the same number of teeth.

Further, while the head structure 10 having the differential mechanism 27 was described with respect to the foregoing embodiment, the invention can as well have a configuration having no differential mechanism 27.

Figure 8:
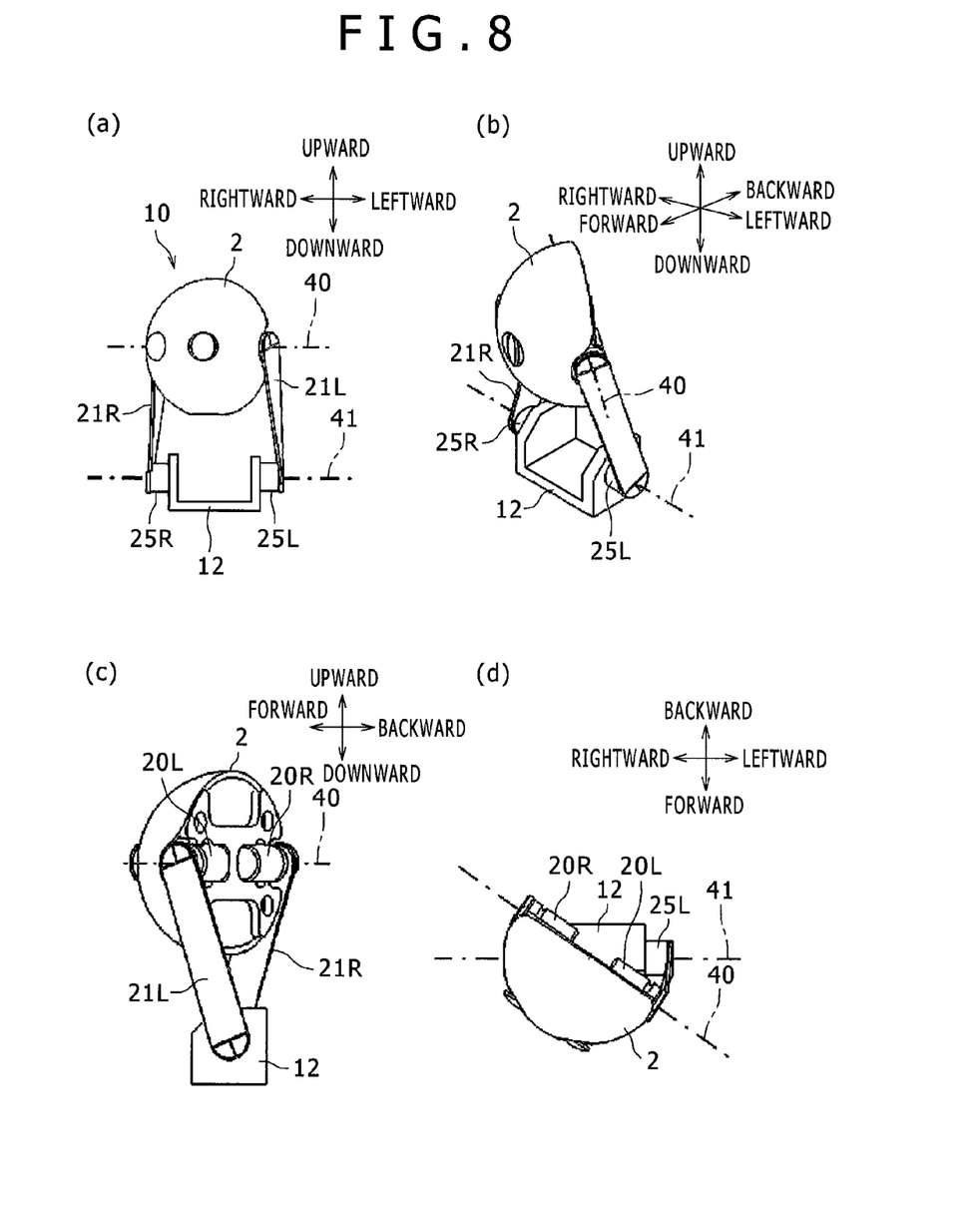

FIG. 8 to be referred to next are descriptive drawings of the head structure of the robot having no differential mechanism 27, of which FIG. 8(*a*) is a front view of the state of the head structure when the head is shaken to look forward to the right, FIG. 8(*b*) is a perspective view showing the head structure of FIG. 8(*a*) as viewed down from ahead leftward, FIG. 7(*c*) is a left side profile of the head structure of FIG. 8(*a*), and FIG. 8(*d*) is a plan of the head structure of FIG. 8(*a*).

In FIGS. 8(*a*) through 8(*d*), reference sign 10 denotes a head structure pertaining to this embodiment for causing the head 2 to act; reference sign 20L, a first motor to which one end of the left elastic frame 21L is to be fitted; reference sign 20R, a second motor to which one end of the right elastic frame 21R is to be fitted; reference sign 25L, a left rubber bush (elastic supporting member) intervening between the trunk frame 12 and the other end of the left elastic frame 21L; reference sign 25R, a right rubber bush (elastic supporting member) intervening between the trunk frame 12 and the other end of the right elastic frame 21R; reference sign 40, a head pitch shaft; and reference sign 41, a neck base pitch shaft.

Figure 2:
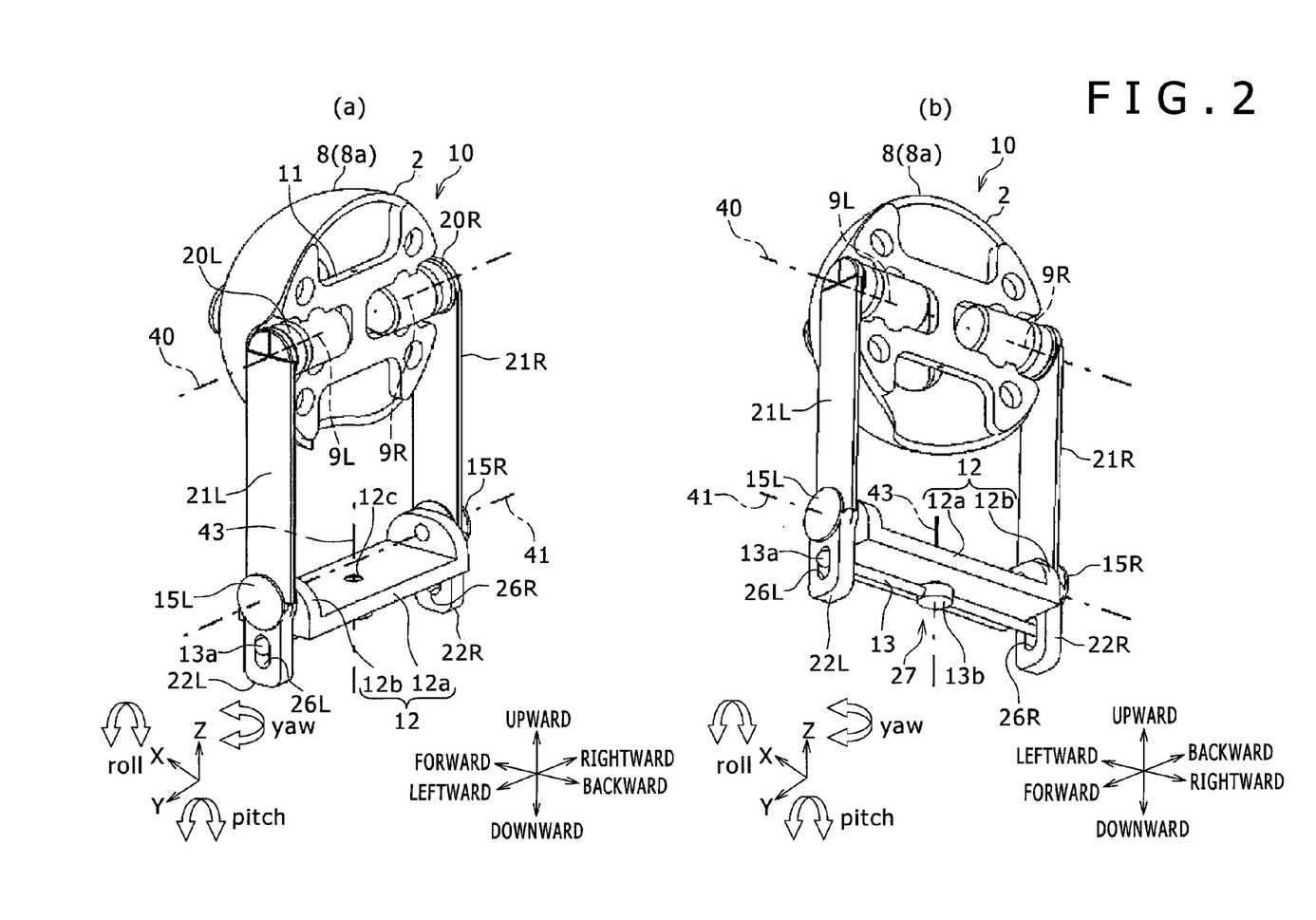

As described with reference to the foregoing embodiment, the differential mechanism 27 (see FIG. 2(*b*) and FIG. 7(*a*)) is not an indispensable constituent element for the leftward and rightward shaking actions of the head 2 in the head structure 10.

As shown in FIGS. 8(*a*) through 8(*d*), the head structure 10 here has no differential mechanism 27, and the other end of the left elastic frame 21L and the other end of the right elastic frame 21R are respectively supported by the left rubber bush (elastic supporting member) and the right rubber bush (elastic supporting member) fitted to the trunk frame 12.

In such a head structure 10, the left rubber bush and the right rubber bush function as torsion springs around the neck base pitch shaft 41. As a result, this head structure 10 can absorb geometric displacements of the left elastic frame 21L and the right elastic frame 21R due to the difference in revolving angle between the first motor 20L and the second motor 20R. As a result, this head structure 10 allows smoother head shaking actions than a structure having neither such left rubber bush 25L nor right rubber bush 25R.

These left rubber bush (elastic supporting member) and right rubber bush (elastic supporting member) are not indispensable constituent elements for the leftward and rightward shaking actions of the head 2.

While the foregoing embodiment was described with respect to a case of applying the head structure 10 to a human-shaped robot 1, the invention can be applied to all kinds of moving bodies involving relative motions of a structure supposed to be the head 2 relative to another structure supposed to be the trunk 3.

LIST OF REFERENCE SIGNS

1 Robot
2 Head
3 Trunk
4 Left arm
5 Right arm
6 Left leg
7 Right leg
8 Casing
9L Output shaft
9R Output shaft
10 Head structure
11 Head frame
12 Trunk frame
13 Connecting link
14 Central bevel gear
15L Shaft support
15R Shaft support
20L First motor
20R Second motor
21L Left elastic frame (first elastic beam)
21R Right elastic frame (second elastic beam)
22L Left neck base link
22R Right neck base link
23L Left bevel gear
23R Right bevel gear
25L Left rubber bush (elastic supporting member)
25R Right rubber bush (elastic supporting member)
27 Differential mechanism
40 Head pitch shaft; and reference sign
41 Neck base pitch shaft

The invention claimed is:

1. A head structure of a robot comprising:
a first motor and a second motor so supported side by side within a head of the robot as to position their output shafts coaxially;
a first beam member that is driven by the first motor and of which one end is so fitted as to be rotatable around the output shafts and another end, extending in a perpendicular direction from the output shafts, is supported by a trunk of the robot; and
a second beam member that is driven by the second motor and of which one end is so fitted as to be rotatable around the output shafts and another end, extending from the output shafts side by side with the first beam member, is supported by the trunk,
wherein each of the other end of the first beam member and the other end of the second beam member is axially supported around a prescribed axis defined to be along the left-and-right direction of the trunk,
wherein a differential mechanism makes revolving directions of the first beam member and the second beam member around the prescribed axis reverse to each other, and wherein the differential mechanism includes a bevel gear mechanism that makes the revolving directions of the first beam member and the second beam member around the prescribed axis reverse to each other.

2. The head structure of the robot according to claim 1, wherein:
the bevel gear mechanism includes a first bevel gear fitted to the other end of the first beam member, a second bevel gear fitted to the other end of the second beam member, and a central bevel gear disposed on the trunk with the first bevel gear and the second bevel clear meshed with the central bevel gear.

3. The head structure of the robot according to claim 1, wherein:
each of the other end of the first beam member and the other end of the second beam member are supported via an supporting member relative to the trunk.

4. A method for driving a head structure of a robot, the method comprising:
providing a first motor and a second motor supported side by side within the head with respective output shafts of the first motor and the second motor positioned coaxially;
providing a first beam member that is driven by the first motor, and of which one end is fitted to rotate around the output shaft of the first motor and another end extending in a perpendicular direction from the output shaft of the first motor; and
providing a second beam member that is driven by the second motor, and of which one end is fitted to rotate around the output shaft of the second motor and another end extending from the output shaft of the second motor side by side with the other end of the first beam member;
providing a trunk which supports the first beam member and the other end of the second beam member, where each of the other end of the first beam member and the other end of the second beam member are axially supported around a prescribed axis defined to be along a left-and-right direction of the trunk;
providing a bevel gear mechanism that makes revolving directions of the first beam member and the second beam member around the prescribed axis reverse to each other; and
individually revolving the first beam and the second beam member relative to the head with the bevel gear mechanism in reverse directions to each other.

5. The method according to claim 4, wherein the bevel gear mechanism includes a first bevel gear fitted to the other end of the first beam member, a second bevel gear fitted to the other end of the second beam member, and a central bevel gear disposed on the trunk with the first bevel gear and the second bevel gear meshed with the central bevel gear.

6. A head structure of a robot comprising:
a head;
a first motor and a second motor supported side by side within the head with respective output shafts of the first motor and the second motor positioned coaxially;
a first beam member that is driven by the first motor, and of which one end is fitted to rotate around the output shaft of the first motor and another end extending in a perpendicular direction from the output shaft of the first motor; and
a second beam member that is driven by the second motor, and of which one end is fitted to rotate around the output shaft of the second motor and another end extending from the output shaft of the second motor side by side with the other end of the first beam member;
a trunk which supports the first beam member and the other end of the second beam member, where each of the other end of the first beam member and the other end of the second beam member are axially supported around a prescribed axis defined to be along a left-and-right direction of the trunk; and
a bevel gear mechanism that makes revolving directions of the first beam member and the second beam member around the prescribed axis reverse to each other,
wherein the bevel gear mechanism includes a first bevel gear fitted to the other end of the first beam member, a second bevel gear fitted to the other end of the second beam member, and a central bevel gear disposed on the trunk with the first bevel gear and the second bevel gear meshed with the central bevel gear.

* * * * *